(12) United States Patent
Seib et al.

(10) Patent No.: US 8,731,962 B2
(45) Date of Patent: May 20, 2014

(54) PROCESS FOR LINKED HEALTHCARE AND FINANCIAL TRANSACTION INITIATION

(75) Inventors: Christopher D. Seib, Costa Mesa, CA (US); Andrew A. Betz, Pasadena, CA (US); Brian R. Bentow, Bell Canyon, CA (US); Elmahdi Erraji, Costa Mesa, CA (US); William F. Marvin, Philadelphia, PA (US)

(73) Assignee: Instamed Communications LLC, Philadelphia, PA (US)

( * ) Notice: Subject to any disclaimer, the term of this patent is extended or adjusted under 35 U.S.C. 154(b) by 0 days.

(21) Appl. No.: 13/559,904

(22) Filed: Jul. 27, 2012

(65) Prior Publication Data

US 2012/0296815 A1    Nov. 22, 2012

Related U.S. Application Data

(63) Continuation of application No. 11/556,875, filed on Nov. 6, 2006, now Pat. No. 8,538,875.

(60) Provisional application No. 60/733,371, filed on Nov. 4, 2005.

(51) Int. Cl.
*G06Q 10/00* (2012.01)
*G06Q 40/00* (2012.01)
*G06Q 50/22* (2012.01)
*G06Q 20/10* (2012.01)

(52) U.S. Cl.
CPC .............. *G06Q 50/22* (2013.01); *G06Q 20/102* (2013.01)
USPC ................................................ 705/2; 705/40

(58) Field of Classification Search
CPC ............................ G06Q 50/22; G06Q 20/102

USPC ........................................................ 705/40, 2
See application file for complete search history.

(56) References Cited

U.S. PATENT DOCUMENTS

| | | |
|---|---|---|
| 5,550,734 A | 8/1996 | Tarter et al. |
| 6,408,284 B1 | 6/2002 | Hilt et al. |
| 6,820,058 B2 | 11/2004 | Wood et al. |
| 6,886,741 B1 | 5/2005 | Salveson |
| 7,039,593 B2 | 5/2006 | Sager |
| 7,178,020 B2 | 2/2007 | DiRienzo |
| 7,346,768 B2 | 3/2008 | DiRienzo |
| 7,370,018 B2 | 5/2008 | Bryant, Jr. et al. |
| 7,409,632 B1 | 8/2008 | DiRienzo |

(Continued)

OTHER PUBLICATIONS

Brenner, Lynn; "Controlling the Cost Monster"; CFO; Oct. 1992.*

(Continued)

*Primary Examiner* — Edward Chang
(74) *Attorney, Agent, or Firm* — Pepper Hamilton LLP

(57) ABSTRACT

Methods and systems for acquiring a pre-approval from a responsible party and receiving funds from a financial account related to the pre-approval in the healthcare field are described herein. A method for collecting payment from an individual for services rendered by a provider is disclosed. The method includes verifying an individual's eligibility for benefits, estimating an individual responsibility amount, acquiring authority from the individual for up to the individual responsibility amount on at least one financial account held by the individual, submitting one or more claims to one or more payer entities requesting compensation for the services rendered by the provider, deducting an amount from the at least one financial account held by the individual, and transferring the deducted amount to the provider.

21 Claims, 6 Drawing Sheets

(56) References Cited

U.S. PATENT DOCUMENTS

| | | |
|---|---|---|
| 2002/0069122 A1 | 6/2002 | Yun et al. |
| 2002/0091549 A1* | 7/2002 | Provost et al. ............ 705/4 |
| 2007/0005402 A1 | 1/2007 | Kennedy et al. |
| 2007/0033070 A1* | 2/2007 | Beck et al. ............ 705/2 |
| 2007/0203813 A1 | 8/2007 | DiRienzo |
| 2008/0155456 A1 | 6/2008 | DiRienzo |

OTHER PUBLICATIONS

Hollern, Glenn. "Adding supplemental insurance encourages employee ownership of benefit plans"; Employee Benefit Plan Review; Oct. 2003.*

* cited by examiner

PROCESS FOR LINKED HEALTHCARE AND FINANCIAL TRANSACTION INITIATION

CROSS-REFERENCE TO RELATED APPLICATIONS

This application is a continuation of U.S. patent application Ser. No. 11/556,875, entitled "Process for Linked Healthcare and Financial Transaction Initiation", filed on Nov. 6, 2006, which claims the priority benefit of U.S. Provisional Patent Application No. 60/733,371, entitled "Process for Linked Healthcare and Financial Transaction Initiation", filed on Nov. 4, 2005.

BACKGROUND

The disclosed embodiments generally relate to the field of healthcare payments.

Healthcare service provider entities, such as physician practices, hospitals, and including third party medical billers may collect funds for healthcare services rendered to a patient from at least two entities: one or more healthcare payer entities, such as a commercial health plan provider, for example, an insurance company, a governmental carrier, such as, Medicare, and/or Medicaid, an employer, or any other entity providing coverage for healthcare services, and one or more responsible parties, such as a patient or a patient's parent or legal guardian. In order to accurately collect funds from all entities, the healthcare service provider must submit a healthcare claim to the healthcare payer entity or entities, and then bill the responsible party for the remaining balance. This can be a time consuming and inefficient process.

Accordingly, there is a need for a process for collecting funds from a healthcare payer entity and a responsible party that is more efficient and less time consuming.

SUMMARY

Embodiments of the invention include a method for collecting payment from an individual for services rendered by a provider including estimating an amount for which the individual may be responsible based on services to be rendered by a healthcare service provider to; acquiring authority from the individual to deduct a specified amount from at least one financial account held by the individual, said specified amount being consistent with the estimated amount; submitting one or more claims to one or more payer entities requesting compensation for the services rendered by the provider; determining an amount to be deducted based on a response received from the one or more payer entities; deducting an amount from the at least one financial account held by the individual; and transferring the deducted amount to the provider.

In embodiments, a network may route information pertaining to a financial transaction or claim to one or more financial entities housing the at least one financial account held by the individual or one or more payer entities, and in some embodiments, the information may be processed by the network prior to routing, and processing is in accordance with the Standard Financial Network Authorization Process.

In some embodiments, a service provider may route information pertaining to a financial transaction or claim to one or more financial entity and/or one or more payer entity, and in other embodiments, the service provider may route information to a network wherein the network routes the information to one or more financial entity or one or more payer entity. In certain embodiments, the at least one of the service provider may process the information prior to routing.

In embodiments, estimating an amount for which the individual is responsible further may include acquiring eligibility and benefit information from one or more payer entities, financial entities, healthcare provider fee schedules, or combinations thereof and using the acquired eligibility and benefit information to determine the estimated amount. In some embodiments, the step of deducting the amount from the financial account held by the individual further includes determining an amount the provider may be allowed to charge for the services rendered; determining an amount the payer entity will compensate the provider for the services rendered; and determining an amount owed by the individual, wherein the amount owed is a difference between the amount the provider is allowed to charge and the amount the payer entity will compensate the provider, a co-pay, or a combination of both.

The provider of embodiments may be a healthcare service provider; the financial entity may be a financial institution, a hank, a credit card company, a loan company, and combinations thereof; the financial account may be a savings account, a checking account, a credit account, a debit account, a credit card account, a debit card account, a health savings account, and combinations thereof; and the payer entity may include a healthcare payer entity, an insurance company, a health savings account, and combinations thereof.

The authority acquired, in some embodiments, may provide authority to place a hold on an account for a specified amount, or pre-authorize the transfer of a specific amount to the provider.

Other embodiments may include a method for collecting payment from an individual for services rendered by a provider including acquiring eligibility and benefit information from one or more of a payer entity, a financial entity, or combinations thereof; estimating the amount a payer entity will compensate a healthcare service provider based on one or more contracts between the healthcare service provider and one or more payer entities; estimating an amount of compensation the individual will owe after the payer entity has provided compensation to determine a defined amount; acquiring authority from the individual to perform a transaction for at least the defined amount on at least one financial account held by the individual; submitting one or more claims to one or more payer entities requesting compensation for the services rendered by the provider; determining an amount to be deducted based on a response received from the one or more payer entities; deducting an amount from the at least one financial account held by the individual wherein the amount deducted may not be more than the defined amount; and transferring the deducted amount to the provider. By verifying the eligibility of the individual and coverage levels and acquiring authority from the individual to perform a transaction, the healthcare service provider can ensure that payment will be received from the individual after the claim has been adjudicated by the payer entity.

In embodiments, estimating the defined amount owed by the individual may include: determining an amount the provider is allowed to charge for the services rendered; determining an amount the payer entity will compensate the provider for the services rendered; and determining an amount owed by the individual, wherein the amount owed is a difference between the amount the provider is allowed to charge and the amount the payer entity will compensate the provider, a co-pay, or a combination of both. In certain embodiments, the method may further include the step of determining if a co-pay amount is due at a point of service.

The provider of embodiments may be a healthcare service provider; the financial entity may be a financial institution, a bank, a credit card company, a loan company, and combinations thereof; the financial account may be a savings account, a checking account, a credit account, a debit account, a credit card account, a debit card account, a health savings account, and combinations thereof; and the payer entity may be a healthcare payer entity, an insurance company, a health savings account, and combinations thereof.

Still other embodiments may include a system for facilitating payment to a provider from an individual including a means for estimating an amount for which the individual will be responsible to determine an estimated amount; a means for authorizing a transaction from at least one financial account held by the individual in the amount of the estimated amount; a means for acquiring compensation from a payer entity; and a means for deducting an amount from the at least one of the financial account held by the individual.

BRIEF DESCRIPTION OF THE DRAWINGS

For a fuller understanding of the nature and advantages of the present invention, reference should be made to the following detailed description taken in connection with the accompanying drawings, in which.

DETAILED DESCRIPTION

Figure 1:
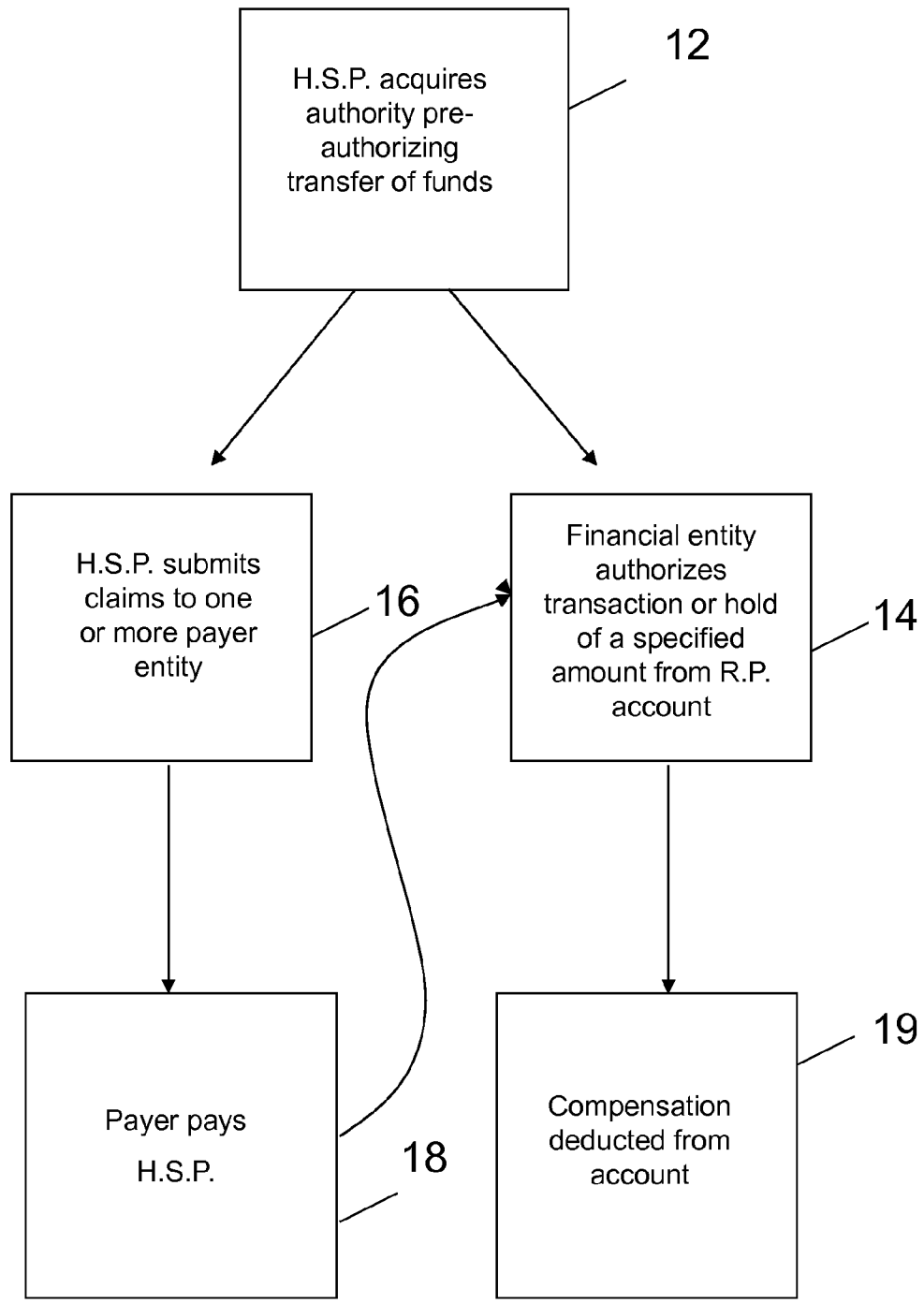
FIG. 1 illustrates a flow chart of embodiments of the invention.

Before the present methods, systems and materials are described, it is to be understood that this disclosure is not limited to the particular methodologies, systems, and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. Nothing herein is to be construed as an admission that the embodiments described herein are not entitled to antedate such disclosure by virtue of prior invention.

A "financial entity" as used herein may refer to an entity, such as a bank or issuer of a credit card or debit card.

A "financial network" or "financial transaction network" may refer to an entity that serves as a representative of a financial entity and may act as an intermediary between a financial entity and a service provider, for example, a healthcare service provider.

A "healthcare network" or "healthcare transaction network" may be considered an entity that serves as a representative of a healthcare service provider and may act as an intermediary between a healthcare service provider entity and a healthcare payer entity.

As used herein, a "healthcare service provider" may refer to an entity that provides healthcare services and collects funds from one or more healthcare payer entities and/or one or more responsible parties for the healthcare services provided to a patient. Health-care service providers may include, but not be limited to, a hospital, a doctor, a chiropractor, a radiologist, and a pharmacy.

A "service provider" may be any entity that which provides support to a healthcare service provider in collection of compensation. In some embodiments a service provider may act as a third party repository, or clearinghouse, for collecting healthcare payer entity, health care service provider, financial entity, and/or subscriber information and in others, a service provider may act as an intermediary between healthcare payer entity, health care service provider, financial entity, and/or subscriber.

A "payer entity" may refer to any entity that may provide financial compensation to a healthcare service provider on behalf of a responsible party for services rendered by the healthcare service provider. Non-limiting examples of a healthcare payer entity may include a commercial health plan, a government carrier, such as, Medicare or Medicaid, an employer, or other entity providing a patient with financial coverage for healthcare services.

A "responsible party" may generally be an entity provided with healthcare services by a healthcare provider, such as, a patient, or if the patient is a minor or other dependent, the patient's parent or legal guardian.

Embodiments of the invention described herein generally include methods for initiating one or more financial transactions for the purpose of collecting payment from a responsible party for services provided by a health care service provider. More specifically, an embodiment of the disclosed method is illustrated in FIG. 1 and may include the following steps:

1) a healthcare service provider may acquire authority from one or more responsible parties pre-authorizing, as in step 12 a financial entity maintaining one or more financial accounts on behalf of the responsible party to authorize the expenditure of funds up to a desired, or specified, amount as in step 14 to be paid to the healthcare service provider as compensation for services provided;

2) the healthcare service provider may submit one or more healthcare claims to one or more healthcare payer entities as in step 16, and the amount of compensation provided by the one or more healthcare payer entities may be determined and/or paid to the healthcare service provider as in step 18; and 3) compensation not provided by the one or more healthcare payer entities may be deducted from the specified amount subject to the pre-authorization and paid to the healthcare service provider as in step 19.

In some embodiments, the specified amount of compensation provided during pre-authorization, may be an estimate based on an amount which will not be paid by one or more healthcare payer entities, and in certain embodiments, verification of a patient's eligibility and benefit information from a healthcare payer entity may be acquired in a separate step prior to determination of an estimate thereby improving the accuracy of the estimate. In embodiments, a healthcare service provider may be provided access to an individual's eligibility and benefit information, as well as, personal information by acquiring a unique identifier for the individual. The unique identifier may be an alphanumeric code unique to the individual that has been assigned by the payer entity or a service provider. In other embodiments, the amount deducted from the specified amount may be the balance of the amount owed to the healthcare service provider minus the compensation provided by the healthcare payer entity.

A pre-authorization step as referred to herein may include an agreement between a healthcare service provider and a responsible party, wherein the responsible party provides authority, for example legal or financial authority, to the healthcare service provider to make available or maintain a specified amount in a financial account held by the responsible party. In some embodiments, pre-authorization may include removal of a specified amount from a financial account owned by the responsible party and placement of that amount may be "held" in a separate financial account, for example, an escrow account, by the financial entity maintaining the account or a third party financial entity. Additionally, a line of credit or a loan may be used to hold the specified amount and the subscriber may be responsible for repayment of the loan. In embodiments, as part of the pre-authorization step, the responsible party may agree that the specified amount may be automatically deducted from the financial account and transferred to a service provider at a later date.

Figure 2:
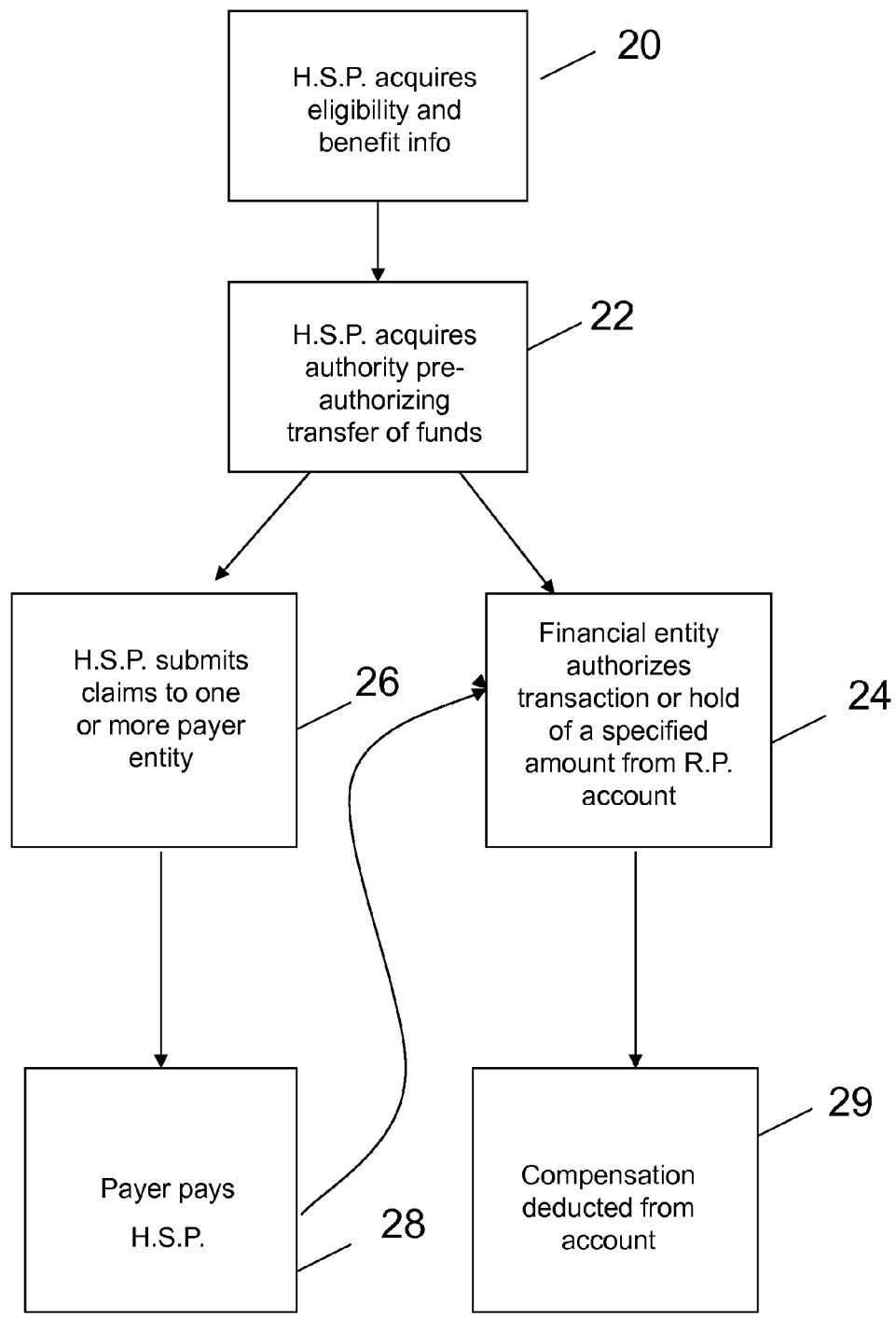
FIG. 2 illustrates a flow chart of embodiments of the invention including the step of validating eligibility and benefit information from a healthcare payer entity.

FIG. 2 illustrates another embodiment of a method by which eligibility and benefit information may be acquired. In a first step, a healthcare service provider may acquire eligibility and benefit information from a healthcare payer entity as in step 20, and the healthcare service provider may use this information to estimate the amount of compensation that may be obtained from a responsible party to pay for services provided. The healthcare service provider may acquire pre-authorization from a responsible party as in step 22 that enables the healthcare service provider to assume the availability of a specified amount of funds from a financial entity maintaining one or more accounts on behalf of the responsible party as in step 24. Note that as described above funds may be authorized for transfer, or as described in this embodiment funds may be "held" as part of the pre-authorization. The healthcare service provider may submit one or more claims to one or more healthcare payer entities as in step 26 and the amount of compensation provided by the one or more healthcare payer entities may be determined and/or paid to the healthcare service provider in step 28. Compensation that is not provided by the one or more healthcare payer entities may than be deducted from the specified amount in response to the pre-authorization step, and paid to the healthcare service provider as in step 29.

In some embodiments, information acquired from a service provider or payer entity may include, but not be limited to, name, address, phone number, social security number, and the like for the subscriber, patient, or dependent, and information regarding the subscriber's benefit information, such as, plan identification number, insurance company contact information or an electronic link to the insurance company, insurance eligibility information and status, such as, policy limits, to-date co-pays, deductibles, co-insurance percentages, annual and lifetime out of pocket maximums, and fee schedules. This information may be used to quickly and accurately estimate the amount for which the subscriber is responsible and financial transactions and claim submissions may be initiated. For example, it may be determined that no compensation is required by the responsible party, or the responsible party is only required to pay a standard co-pay, and in some cases, the responsible party may be required to pay some portion or all of the total payment amount based on whether their deductible amounts have been met, in addition to co-insurance percentages, and out of pocket maximum amounts. In still other embodiments, a service provider may calculate benefit information using this information and transmit co-pay and deductible information as well as claim information directly to the provider, or may initiate financial or claim transactions.

Other embodiments of the methods provided herein may provide a continuous flow of information from a healthcare service provider, healthcare payer entity, and financial entities as described above. In some embodiments, the flow of information may include healthcare and financial networks which may process and route information to a healthcare payer entity or a financial entity. In still other embodiments, a service provider may process and route information between, for example, a healthcare service provider, a healthcare payer entity, and a healthcare network, or a healthcare service provider, a financial entity, and a financial network.

Figure 3:
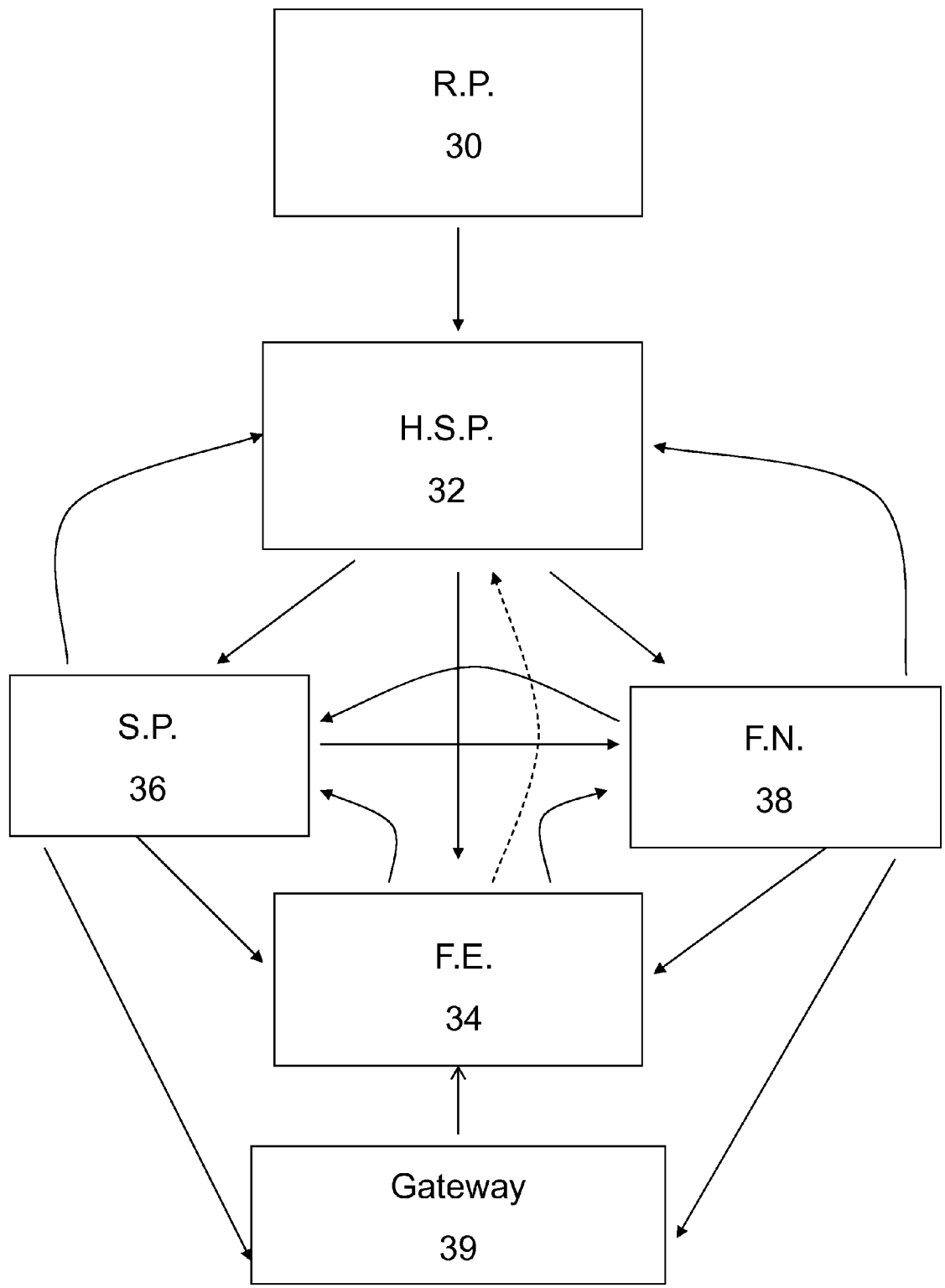
FIG. 3 illustrates a flow chart of embodiments of transmitting a pre-approval and hold to a financial entity.

FIG. 3 illustrates a flow of information in an alternate embodiment where a pre-authorization and a hold may be transmitted between a healthcare service provider 32 and a financial entity 34. In embodiments, a healthcare service provider 32 may acquire a pre-authorization from a responsible party 30, and a transaction for the specified amount may be authorized by a financial entity 34 holding a financial account on behalf of the responsible party 30 to be released to the healthcare service provider 32 at a later date. In alternate embodiments, a healthcare service provider 32 may acquire a pre-authorization request from a responsible party 30, and the pre-authorization request may be communicated to a separate service provider 36 that may route requests either directly to a financial entity 34 or through an appropriate financial network 38 and to a financial entity 34. In other embodiments, a pre-authorization may be transmitted from a healthcare service provider 32 directly to a financial network 38 where the pre-authorization request may be transmitted to a financial entity 34. In certain embodiments, a service provider 36 or financial network 38 may route a pre-authorization request through one or more network gateways 39 such as, for example, a credit card authorization network, online or offline debit card authorization, or electronic check/automated clearinghouse (ACH) financial network before the request is transmitted to a financial entity 34.

In other embodiments, a network gateway 39 may include an entity that provides one or more access point to a network and may route transactions to an appropriate location within that network. For example, a financial network gateway vendor may provide access to a credit card company's financial network through a simple application program interface, and the network gateway may route the transaction to the appropriate processor in the financial network based on its own routing algorithms.

Additionally, the pre-authorization request may be processed before being transmitted to a financial entity. In some embodiments, a service provider 36 may process the request, and in others, a financial network 38 may process the request. In still other embodiments, both a service provider 36 and a financial network may process a request. For example, a service provider may perform a translation of a pre-authorization request from a healthcare service provider 32 and then route the request to a financial network 38. Upon receiving a request, a financial network 38 may further process the pre-authorization request using, for example, the "Standard Financial Network Authorization Process" before routing the request to a financial entity 34 wherein a financial account is maintained.

When a request is received by a financial entity 34, the request may be processed and a response to the request may be transmitted directly to a healthcare service provider 32 (as indicated by the curved arrows) or to a healthcare service provider 32 through a service provider 36 or a financial network 38 (as indicated by the curved arrows). A response from a financial entity may be positive, authorizing the request, or negative, denying the request. In the event of a positive response, transaction may be authorized or funds may be held per the standard policies and business practices of the financial entity 34 for the specified amount and the funds may be received by the healthcare service provider 32 at a later date (as indicated by the dashed curved arrow). In the event of a negative response, the healthcare service provider 30 may elect to reinitiate this process with the same or a modified pre-authorization request.

Figure 4:
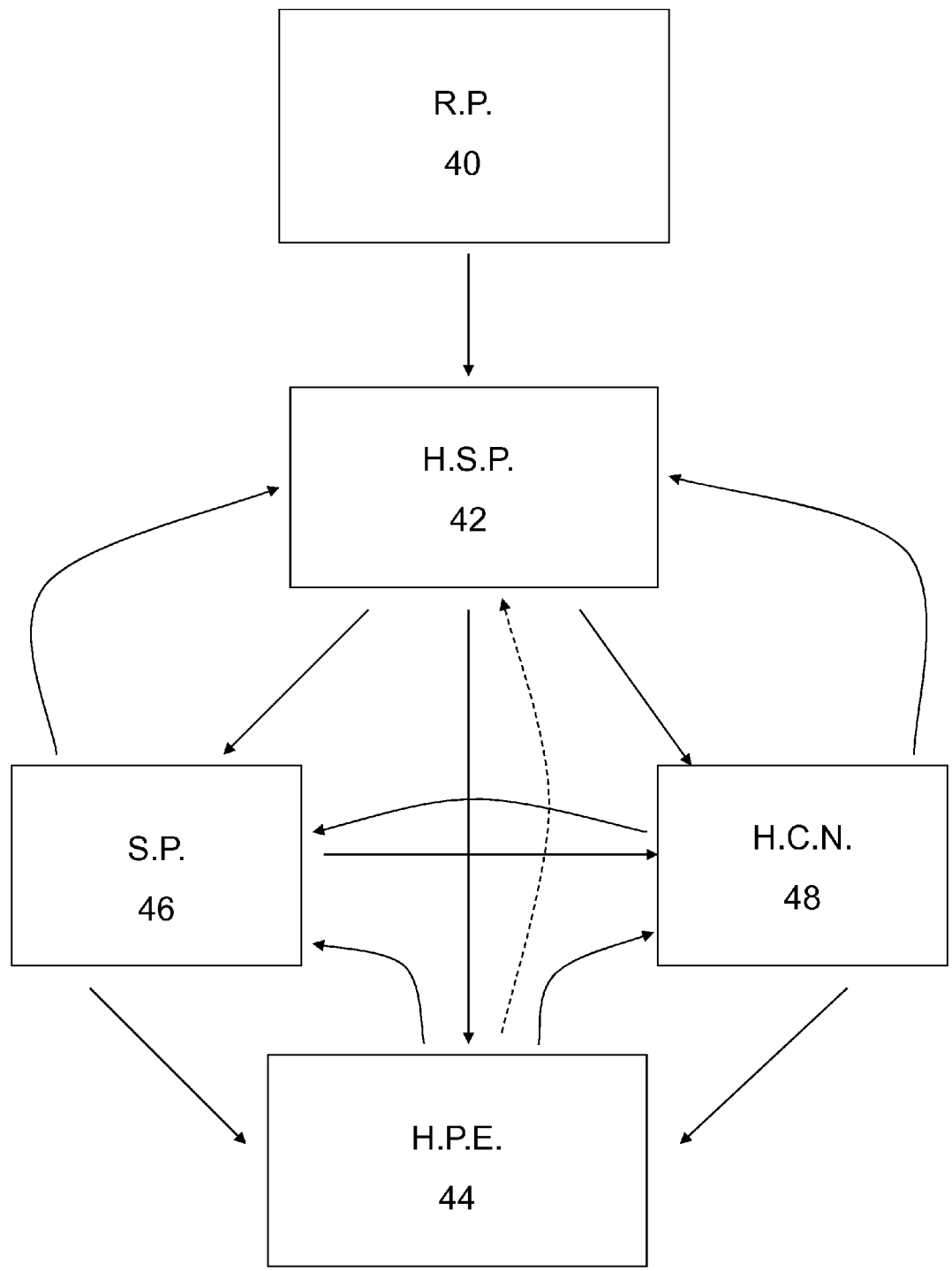
FIG. 4 illustrates a flow chart of embodiments of transmitting a claim to a healthcare payer entity.

FIG. 4 illustrates embodiments of the invention where a healthcare claim may be transmitted from a healthcare service provider 42 to a healthcare payer entity 44. In embodiments, a healthcare service provider 42 may directly submit to one or more healthcare claim entities 44 for services rendered to a responsible party 40 with the intent of collecting payment from a healthcare payer. Some embodiments include one or more claims that may be submitted from a healthcare service provider 42 to a service provider 46 and the service provider may transmit a claim to a healthcare payer entity 44 or may forward the claim to a healthcare network 48 where the claim may be transmitted to a healthcare payer entity 44. In alternate embodiments, a claim may be submitted from a healthcare service provider 42 to a healthcare network 48, and the healthcare network 48 may transmit the claim to a healthcare payer entity 44. The claim may be transmitted to the healthcare payer 44 entity as submitted by the healthcare service provider 42, or the claim may be processed by either the service provider 46, the healthcare network 48, or both the service provider 46 and the healthcare network 48.

Once a claim has been received by the healthcare payer entity 44, it may be processed and a response may be prepared. During processing, a claim may be accepted for adjudication, and adjudication results, such as, for example, a healthcare remittance, payment advice, or an explanation of benefits, may be prepared and transmitted to the healthcare service provider 42 directly or through a healthcare network 48, a service provider 46, or both a healthcare network 48 and a service provider 46 (as indicated by curved arrows). In embodiments, adjudication results may contain information regarding allowed compensation for services provided per a contract or other arrangement between a healthcare payer entity 44 and a healthcare service provider 42 and/or a responsible party 40; a paid amount provided by a healthcare payer entity 44 for services rendered per a contract or other arrangement between a healthcare payer entity 44 and a healthcare service provider 42 and/or a responsible party 44, and an amount for which a responsible party 40 may be responsible. In some embodiments, the amount for which the responsible party 40 may be responsible may be the difference between the allowed compensation and the paid amount by the healthcare payer entity 44.

The process through which a claim is processed may vary between embodiments of the invention. For example, a healthcare payer entity 44 may receive a claim, and acknowledge receipt of the claim to the healthcare service provider. The claim may be initially edited, such as, for example, confirming that claim and payer identifiers are appropriately formatted, required data elements are provided, that the provider is in the network, that the member is eligible for benefits, and the like. IT edits fail, a claim rejection or deletion notice may be prepared based on business rules defined by the healthcare payer entity 44, and the notice may be transmitted to the healthcare service provider 42. When a claim is accepted, an adjudication process may be initiated. Any adjudication process known in the art may be used in embodiments of the invention. Generally, adjudication may involve determining the allowed amount for each of a claim's charges. An allowed amount may be the amount a healthcare service provider may charge for a particular service rendered, and may be determined based on a contract or other agreement between a healthcare service provider and a healthcare payer entity. All or a portion of the allowed amount may be paid by the healthcare payer entity. In the event that a healthcare payer entity pays only a portion of the allowed amount, adjudication may further include a determination of the portion of the allowed amount to be paid by another party, such as, for example, a responsible party. Following processing and adjudication, the healthcare payer entity may provide the healthcare service provider and/or responsible party with notification of the adjudication results.

Figure 5:
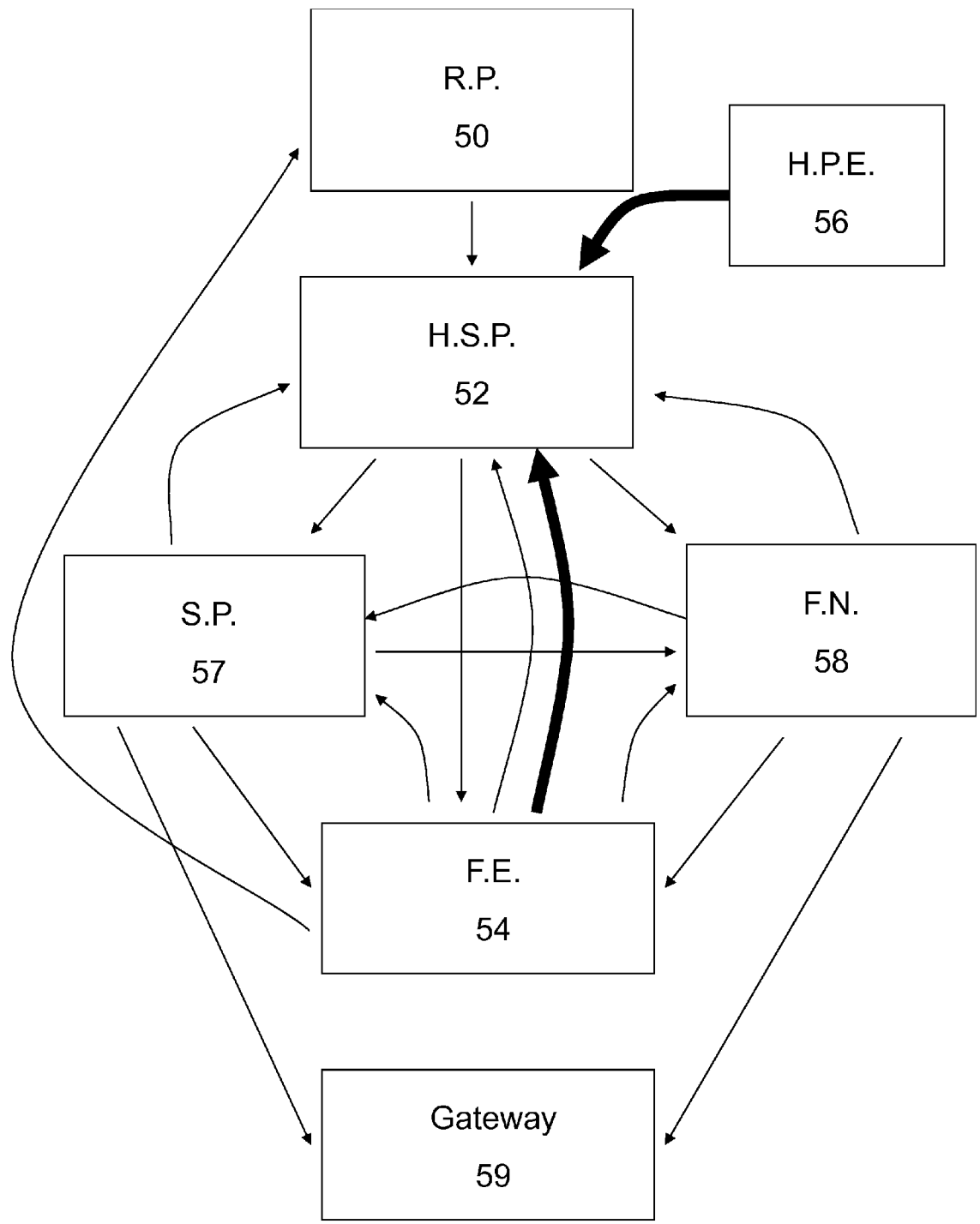
FIG. 5 illustrates a flow chart of embodiments of acquiring ds from a financial entity.

FIG. 5 illustrates embodiments of the invention wherein a healthcare service provider 52 acquires funds from a financial entity 54 maintaining a financial account on behalf of a responsible party in response to a pre-authorization request. In such embodiments, a healthcare service provider 52 may generate a financial transaction request based on the total amount owed or a contracted amount due for services provided to a responsible party minus compensation received from a healthcare payer entity 56 that may not be greater than the specified amount provided in the pre-authorization request. The financial transaction request may than be transmitted directly to the financial entity 54 maintaining a financial account on behalf of a responsible party in response to a pre-authorization request, to a service provider 57 or a financial network 58 that may transmit the request to a financial entity 54, or to a service provider 57 that may transmit the request to a financial network 58 that may forward the request to a financial entity 54. As in FIG. 3, the financial transaction request may be routed from a service provider 57 or a financial network 58 to a financial network gateway 59 and to a financial entity 54. The financial transaction request may be processed by either a service provider 57 or a financial network 58, or both a service provider 57 and a financial network prior to being routed to a financial network gateway 59 or a financial entity 54.

When a financial transaction request is received by a financial entity 54, the financial entity 54 may generate a response (as indicated by the curved arrows), transfer funds (as indicated by the bold curved arrow) directly to the healthcare service provider, or both generate a report and transfer funds. In embodiments, a response may include information pertaining to reasons why a financial transaction request is denied, for example, an error occurred during transmission of a financial transaction request or an error occurs while attempting to complete the transaction, or a response may include confirmation that a financial transaction request has been accepted, acquisition of funds was successful, or acknowledging transfer of funds following the actual transfer. In some embodiments, a response may be routed directly to a healthcare service provider 52, or to a healthcare service provider through a service provider 57 or a financial network 58, or both a financial network 58 and a service provider 57. In embodiments, the amount not paid by the payer entity may be automatically deducted from the pre-approved account, or alternatively, a remittance containing the amount for which the patient is responsible may be transmitted to the healthcare service provider using, for example, a paper receipt or bill. The healthcare service provider may then manually initiate a transfer of funds. In other embodiments a responsible party 50 may be provided with a response indicating that funds held by the financial entity have been transferred, such as, for example, an explanation of benefits, a receipt, statement, or periodic report that shows the transfer of funds.

Figure 6:
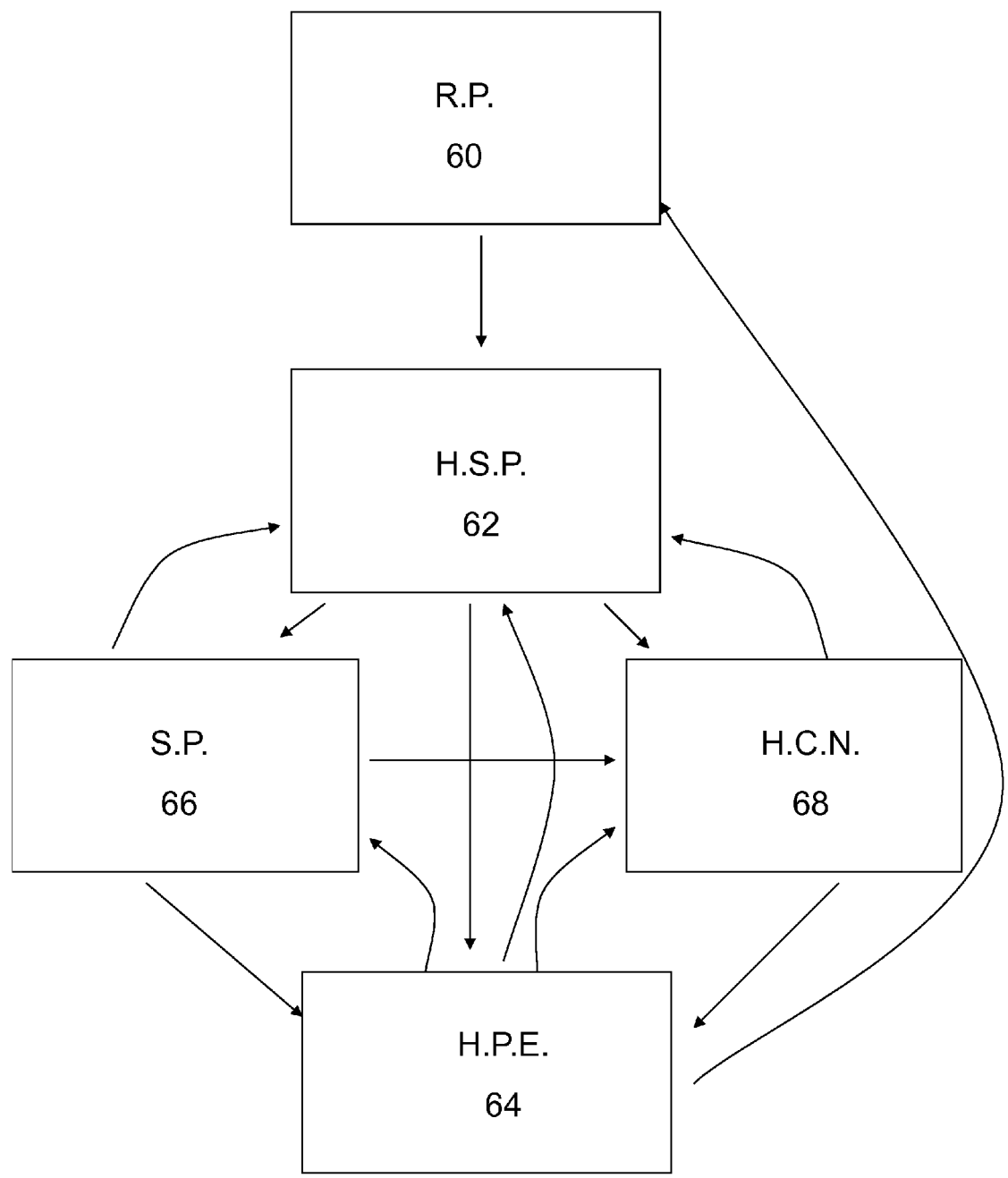
FIG. 6 illustrates a flow chart of embodiments of acquiring eligibility and benefit information from a healthcare payer entity.

In some embodiments, the method of the invention may further include verification of a responsible party's eligibility and benefits. For example, as illustrated in FIG. 6, a healthcare service provider 62 may initiate an eligibility/benefit inquiry to a healthcare payer entity 64 directly or to a service provider 66. A service provider 66 in embodiments may select which entity to route individual transactions based on information in the individual transaction unit and a memory at a service provider that may map data fields that may occur in a transaction unit to the configured healthcare network of healthcare payer entity 64. For example, a primary payer identification number may be used to look up an identifier to a healthcare payer entity 64 or healthcare network 68 that may be used to expediently retrieve information regarding a responsible party 60 based on information stored by a service provider 66. In some embodiments, the service provider 66 may route an eligibility/benefit inquiry directly to a healthcare payer entity 64 or to a healthcare payer entity 64 through a healthcare network 68, and may or may not process the inquiry prior to routing. When an eligibility/benefit inquiry is received by a healthcare payer entity 64, and the healthcare payer entity 64 may respond either directly to the healthcare service provider 62, through a healthcare network 68 or service provider 66, or both a healthcare network 68 and a service provider 66 to the healthcare service provider 62.

The information provided by the healthcare payer entity may be used to determine the amount to be withheld in the pre-authorization request acquired from the responsible party and whether the responsible party is eligible to use a method of the invention. Therefore, in addition to eligibility and benefit information provided by a healthcare payer entity in some embodiments, information from one or more financial entities such as, for example, a review of the credit or debit account information, and/or a financial history of a responsible party may be acquired, and used to determine eligibility for a responsible party. In other embodiments, other rules may be used by a healthcare service provider or a financial entity to determine eligibility of a responsible party for use of a method of the invention.

Methods of embodiments of the invention may not be limited by methods or processes that may be used to transmit information, such as, for example, a pre-authorization and hold request, a financial transaction request, eligibility/benefit information, transferred funds, and the like. For example, information may be transmitted by methods including, but not limited to, mail, telephone, facsimile, electronic network, and wireless network.

Embodiments of the invention also include a system for facilitating payment to a healthcare service provider from a responsible party including a means for authorizing a transaction between one or more financial entity maintaining at least one account on behalf of the responsible party, a means for acquiring compensation from a payer entity, and a means for automatically deducting an amount from the one or more financial account owned by the responsible party. In some embodiments, the means for authorizing a transaction may be an agreement between the responsible party and the provider which allows the provider to deduct an amount from the one or more financial account at a later date. In other embodiments, the means for acquiring compensation from a payer entity may be a claim, such as an insurance claim, by which the provider may petition a payer entity for compensation for services rendered to a responsible party based on an agreement or contract between the responsible party and the payer entity. The means for automatically deducting an amount from a financial account, in embodiments, may be any means for transferring money from one entity to another including, but not limited to, electronic transfer, wire transfer, credit card transaction, and check, and in some embodiments, the transfer may be automatically triggered based on terms agreed to by the responsible party and the provider and provided for in the means for authorizing a transaction from an account.

Certain embodiments, for example, a computer network, may be used to transmit information. In such embodiments, information regarding a transaction or a responsible party may be entered into a computer terminal or processor using, for example, a keyboard, microphone, scanner, card reader, or touch screen, and this information may be transmitted to, for example, a service provider, healthcare network, financial network, healthcare payer entity, or financial entity, where the transmitted information may be received by another computer terminal or processor. Information may be stored at any point during transmission, for example, a service provider or healthcare payer entity may record receipt of transmission by recording the transmission or information regarding the transmission, and recording may take place by any method known in the art, for example, a printout, or an electronic record stored on an computer drive, such as, an external or internal floppy disk drive, internal or external writable CD or DVD drive, or internal or external hard drive, or flash drive. In some embodiments, calculations regarding information transmitted may take place on individual computer terminals or processors, or information may be collected by individual computer terminals or processors and transferred to a central processing computer or processor. In still other embodiments, an element manager, such as, for example, real-time data buffers, conveyors, file input processor, database index, shared access memory loader, reference data buffer and data managers may be used and may include a software application stored in one or more computer terminals or processors or a central terminal or processor. In yet other embodiments, a display interface, such as, but not limited to, an audio, graphic, or alphanumeric interface, may be used that may allow a user to interface with the transmitted information.

It will be appreciated that variations of the above-disclosed and other features and functions, or alternatives thereof, may be desirably combined into many other different systems or applications. Also, that various presently unforeseen or unanticipated alternatives, modifications, variations, or improvements therein made, be subsequently made by those skilled in the art.

What is claimed is:

1. A system for collecting payment from an individual for services rendered by a provider, the system comprising:
   a processor; and
   a non-transitory, computer-readable storage medium in operable communication with the processor, wherein the storage medium comprises one or more programming instructions, that, when executed, cause the processor to:
   acquire eligibility and benefit information from at least one of a payer entity, a financial entity, and a healthcare provider fee schedule, wherein the eligibility and benefit information comprises:

an amount the provider is allowed to charge for the services rendered, an amount the payer entity will compensate the provider for the services rendered, and an amount owed by the individual, wherein the amount owed is a difference between the amount the provider is allowed to charge and the amount the payer entity will compensate the provider, a co-pay, or a combination thereof;

determine an estimated amount for which the individual is responsible after the services are rendered by the provider using the acquired eligibility and benefit information;

provide the estimated amount to the individual;

transmit one or more claims for adjudication to one or more third party payer entities requesting compensation for the services rendered by the provider;

automatically determine, without a user input, an amount to be deducted from at least one financial account held by the individual based on an amount not paid by the one or more third party payer entities;

automatically deduct, without a user input, the determined amount from the at least one financial account held by the individual; and automatically transfer, without a user input, the deducted amount to the provider.

2. The system of claim 1, wherein the storage medium further comprises one or more programming instructions, that, when executed, cause the processor to route, by a network, information pertaining to a financial transaction or the one or more claims to one or more financial entities housing the at least one financial account held by the individual or one or more payer entities.

3. The system of claim 2, wherein the storage medium further comprises one or more programming instructions, that, when executed, cause the processor to process, prior to routing, the information in accordance with a Standard Financial Network Authorization Process.

4. The system of claim 1, wherein the storage medium further comprises one or more programming instructions, that, when executed, cause the processor to route, by a service provider, information pertaining to a financial transaction or claim to one or more of the following: a financial entity and a payer entity.

5. The system of claim 1, wherein the storage medium further comprises one or more programming instructions, that, when executed, cause the processor to route, by the service provider, the information to a network, wherein the information is routed to one or more of the following: a financial entity and a payer entity.

6. The system of claim 1, wherein the provider is a healthcare service provider.

7. The system of claim 1, wherein the financial entity is selected from a financial institution, a bank, a credit card company, a loan company, and combinations thereof.

8. The system of claim 1, wherein the financial account is selected from a savings account, a checking account, a credit account, a debit account, a credit card account, a debit card account, a health savings account, and combinations thereof.

9. The system of claim 1, wherein the third party payer entity is selected from a healthcare payer entity, an insurance company, a health savings account, and combinations thereof.

10. A system for collecting payment from an individual for services rendered by a provider, the system comprising:

a processor; and a non-transitory, computer-readable storage medium in operable communication with the processor, wherein the storage medium comprises one or more programming instructions, that, when executed, cause the processor to:

acquire eligibility and benefit information from one or more of a payer entity, a financial entity, and a healthcare provider fee schedule, wherein the eligibility and benefit information comprises:

an amount the provider is allowed to charge for the services rendered, an amount the payer entity will compensate the provider for the services rendered, and an amount owed by the individual, wherein the amount owed is a difference between the amount the provider is allowed to charge and the amount the payer entity will compensate the provider, a co-pay, or a combination thereof;

estimate a defined amount of compensation the individual will owe after the payer entity has provided compensation after the services are rendered by the provider using the acquired eligibility and benefit information;

transmit a claim for adjudication to the one or more payer entities requesting compensation for the services rendered by the provider;

automatically determine, without a user input, an amount to be deducted from at least one financial account held by the individual based on an amount not paid by the one or more payer entities;

automatically deduct, without a user input, the determined amount from the at least one financial account held by the individual wherein the amount deducted is not more than the defined amount; and automatically transfer, without a user input, the deducted amount to the provider.

11. The system of claim 10, wherein the storage medium further contains one or more programming instructions, that, when executed, cause the processor to determine a co-pay amount due at a point of service.

12. The system of claim 10, wherein the provider is a healthcare service provider.

13. The system of claim 10, wherein the financial entity is selected from a financial institution, a bank, a credit card company, a loan company, and combinations thereof.

14. The system of claim 10, wherein the financial account is selected from a savings account, a checking account, a credit account, a debit account, a credit card account, a debit card account, a health savings account, and combinations thereof.

15. The system of claim 10, wherein the payer entity is selected from a healthcare payer entity, an insurance company, a health savings account, and combinations thereof.

16. The system of claim 4, wherein the storage medium further comprises one or more programming instructions, that, when executed, cause the processor to process the information prior to routing by the service provider.

17. A method of facilitating payment to a provider from an individual comprising:

acquiring, by a processor, eligibility and benefit information from at least one of a payer entity, a financial entity, and a healthcare provider fee schedule, wherein the eligibility and benefit information comprises:

an amount the provider is allowed to charge for the services rendered, an amount the payer entity will compensate the provider for the services rendered, and an amount owed by the individual, wherein the amount owed is a difference between the amount the provider is allowed to charge and the amount the payer entity will compensate the provider, a co-pay, or a combination thereof;

determining, by the processor, an estimated amount for which the individual will be responsible after services are rendered by the provider using the acquired eligibility and benefit information;

providing, by the processor, the estimated amount to the individual;

transmitting, by the processor, one or more claims for adjudication to one or more payer entities requesting compensation;

automatically determining, by the processor without a user input, an amount to be deducted from the at least one financial account held by the individual based on an amount not paid by the one or more payer entities;

automatically deducting, by the processor without a user input, the determined amount from the at least one financial account held by the individual; and automatically transferring, by the processor without a user input, the deducted amount to the provider.

18. The system of claim 1, wherein the third party payer entity is at least one of a commercial healthcare plan provider, a government healthcare provider, and an employer.

19. The system of claim 1, wherein the provider is a hospital, a doctor, a chiropractor, a radiologist, or a pharmacy.

20. The system of claim 1, wherein the eligibility and benefit information further comprises at least one of a plan identification number, an insurance company contact information, an electronic link to the insurance company, insurance eligibility information, insurance eligibility status, a policy limit, a to-date co-pay, a deductible, a co-insurance percentage, an annual out of pocket maximum, and a lifetime out of pocket maximum.

21. The system of claim 2, wherein the network is a healthcare transaction network.

* * * * *